UNITED STATES PATENT OFFICE.

EDUARD HEPP, OF FRANKFORT-ON-THE-MAIN, AND CHRISTOPH HARTMANN, OF HÖCHST-ON-THE-MAIN, GERMANY, ASSIGNORS TO FARBWERKE VORM. MEISTER, LUCIUS & BRÜNING, OF HÖCHST-ON-THE-MAIN, GERMANY, A CORPORATION OF GERMANY.

ANTHRAQUINONE DERIVATIVES AND PROCESS OF MAKING SAME.

975,863.   Specification of Letters Patent.   Patented Nov. 15, 1910.

No Drawing.   Application filed February 25, 1910. Serial No. 545,858.

*To all whom it may concern:*

Be it known that we, EDUARD HEPP, Ph. D., and CHRISTOPH HARTMANN, Ph. D., citizens of the Empire of Germany, residing at Frankfort-on-the-Main, Germany, and Höchst-on-the-Main, Germany, respectively, have invented certain new and useful Improvements in Anthraquinone Derivatives and Processes of Making Same; of which the following is a specification.

Our invention relates to the manufacture of new anthraquinone derivatives dyeing in the vat by heating an amidoanthranol itself or in presence of a solvent, with or without the addition of a condensing or oxidizing agent. The said bodies can be obtained for instance by causing air to pass through an aqueous hot solution of an amidoanthranol in hydrochloric acid, or by heating a solution of an amidoanthranol in an indifferent solvent like nitrobenzene.

The new dyestuffs are, when dry, dark powders which are insoluble in water, in alkalies and diluted acids, and very little soluble in the usual organic solvents. They dissolve in the hydrosulfites in presence of alkali, yielding then solutions which dye cotton gray to black shades, very fast to light and resisting very well alkalies. For producing the said new dyestuffs we can proceed for instance as follows:

Example I: 10 parts by weight of 1.5 diamidoanthranol are dissolved in 750 parts of water and 25 parts of hydrochloric acid of 20° Bé., this solution is heated to about 90° C. and air is passed through it for about 24 hours. The product is filtered off and in order to purify it is treated with diluted boiling hydrochloric acid until the filtrate has lost its color.

Example II: A solution of 10 parts by weight of 1.5 diamidoanthranol in 100 parts of nitrobenzene is heated for one to two hours to 170–200° C. When the mass has cooled the dyestuff is filtered off.

The new dyestuff is a black to violet-black crystalline powder, having the above mentioned properties and dyeing cotton and wool, from a red vat, gray to black shades. It is soluble in pyridin and nitrobenzene with a violet-blue color.

Having now described our invention, what we claim is:

1. The process of producing new anthraquinone dyestuffs which consists in heating an amidoanthranol, preferably in presence of a solvent, and then isolating the resulting dyestuff, substantially as hereinbefore described.

2. The process of producing a new anthraquinone dyestuff, which consists in heating 1.5-diamidoanthranol, preferably in presence of a solvent, and then isolating the resulting dyestuff, substantially as hereinbefore described.

3. As new products, the herein described new dyestuffs obtainable by heating an amidoanthranol, preferably in presence of a solvent; said dyestuffs being, when dry, dark powders insoluble in water, alkalies and diluted acids, very little soluble in the usual organic solvents, and dissolving in the hydrosulfites in presence of alkalies, yielding then solutions which dye cotton gray to black shades very fast to light and resisting very well alkalies.

4. As a new product, the herein described dyestuff, obtainable by heating 1.5-diamidoanthranol preferably in presence of a solvent; said dyestuff being a black to violet-black crystalline powder, insoluble in water, alkalies and diluted acids, very little soluble in the usual organic solvents, giving, when dissolved in nitrobenzene and pyridin, a blue-violet solution and yielding a red vat from which cotton and wool are dyed gray to black shades.

In testimony whereof, we affix our signatures in presence of two witnesses.

EDUARD HEPP.
CHRISTOPH HARTMANN.

Witnesses.
  CARL GRUND,
  JEAN GRUND.